US008661015B2

(12) United States Patent
Karana

(10) Patent No.: US 8,661,015 B2
(45) Date of Patent: Feb. 25, 2014

(54) IDENTIFICATION OF NAME ENTITIES VIA SEARCH, DETERMINATION OF ALTERNATIVE SEARCHES, AND AUTOMATIC INTEGRATION OF DATA ACROSS A COMPUTER NETWORK FOR DYNAMIC PORTAL GENERATION

(75) Inventor: Abinasha Karana, Bangalore (IN)

(73) Assignee: Bizosys Technologies Private Limited, Bangalore (IN)

( * ) Notice: Subject to any disclaimer, the term of this patent is extended or adjusted under 35 U.S.C. 154(b) by 273 days.

(21) Appl. No.: 13/166,141

(22) Filed: Jun. 22, 2011

(65) Prior Publication Data

US 2011/0320458 A1 Dec. 29, 2011

(30) Foreign Application Priority Data

Jun. 24, 2010 (IN) .......................... 1792/CHE/2010

(51) Int. Cl.
*G06F 17/30* (2006.01)
(52) U.S. Cl.
USPC ........................................ 707/706; 707/707
(58) Field of Classification Search
USPC .................................................. 707/706, 707
See application file for complete search history.

(56) References Cited

U.S. PATENT DOCUMENTS

| | | | | |
|---|---|---|---|---|
| 7,433,944 B2 * | 10/2008 | Kanada et al. | ................ | 709/223 |
| 7,761,844 B2 * | 7/2010 | Bove et al. | .................... | 717/106 |
| 7,996,677 B2 * | 8/2011 | Charles et al. | ................ | 713/175 |
| 2006/0085336 A1 * | 4/2006 | Seubert et al. | .................. | 705/40 |
| 2006/0242195 A1 * | 10/2006 | Bove et al. | ................ | 707/103 R |
| 2007/0055656 A1 * | 3/2007 | Tunstall-Pedoe | ................ | 707/3 |
| 2008/0141330 A1 * | 6/2008 | Charles et al. | .................... | 726/1 |
| 2008/0189289 A1 * | 8/2008 | Dettinger et al. | ............... | 707/10 |
| 2009/0192968 A1 * | 7/2009 | Tunstall-Pedoe | ............... | 706/47 |
| 2010/0241664 A1 * | 9/2010 | LeVasseur et al. | ............ | 707/779 |
| 2011/0167105 A1 * | 7/2011 | Ramakrishnan et al. | ..... | 709/203 |
| 2011/0307435 A1 * | 12/2011 | Overell et al. | .................. | 706/46 |

* cited by examiner

*Primary Examiner* — Baoquoc N To
(74) *Attorney, Agent, or Firm* — Rahman LLC

(57) ABSTRACT

A dynamic portal generation system includes an indexing module that indexes structured and unstructured data in a database. The database includes information residing in associated standalone applications having documents from information sources, and a name-entity repository that includes name entities and their corresponding name-entity types. A search module searches the information residing in the indexed information to obtain a search result. A name-entity extraction module extracts a matching name-entity that corresponds to a name-entity in the name-entity repository. A portal generation module dynamically generates a portal triggered by the search query. The portal generation module aggregates the search result by a type or a source to form search result segments, renders data extracted from the search result segments in corresponding formats, integrates relevant actions corresponding to search result segments and displays actionable portlets that enable the user to perform additional operations on the information residing in associated standalone applications.

20 Claims, 18 Drawing Sheets

| | |
|---|---|
| NAME (902) | XYZ CORP |
| INDUSTRY (904) | SOFTWARE PUBLISHERS,COMPUTER RELATED SERVICES, PREPACKAGED SOFTWARE,COMPUTER TRAINING,COMPUTER SYSTEMS DESIGN SERVICES,COMPUTER SOFTWARE |
| FOUNDERS (906) | THOMAS ANDREW, MARK ANTHONY |
| SHAREHOLDERS (908) | LARRY ELLISON |
| EXCHANGE (910) | STOCK MARKET |
| TICKER (912) | XYZ |
| PHONE (914) | (650) 506-7000 |
| FAX (916) | (650) 506-7200 |
| WEBSITE (918) | WWW.XYZ.COM |

IDENTIFICATION OF NAME ENTITIES VIA SEARCH, DETERMINATION OF ALTERNATIVE SEARCHES, AND AUTOMATIC INTEGRATION OF DATA ACROSS A COMPUTER NETWORK FOR DYNAMIC PORTAL GENERATION

BACKGROUND

1. Technical Field

The embodiments herein generally relate to a computer search program and processing of data across on a computer network, and more particularly, to identification of name entities via search, determination of alternative searches, and automatic integration of data across a computer network for dynamic generation of information via portals, etc.

2. Description of the Related Art

In a business organization, there are three aspects of what typically affects data that users seek on their enterprise network. The factors viz. Users & their tacit knowledge and their intention in terms of what they seek, types of artifacts embedded with data that maps to what user seeks, and actions on the data that leads to creation, modification and deletion of artifacts.

Firstly, users, user groups & their tacit knowledge typically consist of users who could be experts or non-experts at a task, new to the team or old team members. Often users are mobile and travel from location to location, and therefore their data needs change accordingly. Users also change roles or move to new roles due to transfers, promotions, etc. and often require different data. Thus, for a particular network information system, the users often need to memorize and update oneself about where, which programs are located and how their inner structures such as menus, etc. work to perform an action, especially in a scenario where hundreds of programs are available. Actions may be something as simple as update a phone number or create a large proposal in response to a complex requirement of a customer. These actions are typically enabled in an enterprise as web services.

Typically, normal users and/or business users for a business context, access a lot of data, often repeatedly, from a range of web-enabled or web based enterprise programs on a day-to-day basis. These users are expected to learn and acquire significant amount of data such as which programs are required for which business operation in which situation and which order, where are all these programs in the enterprise web and how to locate them, how to use these programs, again in which situation, etc. Such tacit knowledge of programs is likely to require updating whenever user's role or location changes or the programs themselves change.

FIG. 1 illustrates a system view 100 of users 102 communicating with multiple programs 106 through an integration layer 104 via a network. The users 102 retrieve the data from multiple programs 106. But, when there is a change and/or update in the data for any of the activity performed on at least one of the program, the users 102 find it difficult to locate the relevant data from the various programs, especially where a user lacks the tacit knowledge to navigate For instance a new employee with average expertise at performing a task could be required to create a complex artifact by accessing different types of content from across the enterprise that are supposedly relevant to context of his/her task and further, locate specific actions within any of these programs to create a new piece of data.

FIG. 2 illustrates a user interface view of a portal 200 associated with a customer 202. The customer profile of a user (e.g., John Doe) is associated with multiple business contexts.

Here, multiple business contexts may include customer's (e.g., John Doe) contact data 204, reviews 206, call report emails 208, investments 210, weekly trend and recent statement 212 and a calendar 214. The contact data 204 includes customer's mail ID, address and a contact data number. The review report 206 provides a report of survey associated with the customer (e.g., John Doe) in the recent years. The call report email 208 includes the data the communication associated with various activities. The investment 210 provides the details of a financial transaction associated with the customer 202. The weekly trend and recent statements 212 provides the up-to-date data and a status associated with that customer. The calendar 214 provides the date of particular activity being carried out by the customer. The information portal 200 provides an easy view of data associated with a customer. But, at the same time, needs to include a new program in the portal page, thus contributing to more time, and effort to update taxonomy, build new pages, and retrain users over a significant period of time, often running in months.

For example, if a business user has to submit a proposal to Proposal system enterprise program, he/she has to view projects where similar case studies and different business documents are located and collect data to prepare a proposal in response to a Request for Proposal. Often for these actions, user is required to access multiple programs where one is not necessarily aware of the other in terms of a common business context, that spans multiple departments, multiple users, multiple types of artifacts and multiple types of actions.

FIG. 3A-3B illustrates a user interface view 300A-300B of a search associated with a customer profile. The user interface view 300A of the search includes a user search term field 302, and the search results field 304. The user search term field 302 includes a user search term inputted by a user. The users 102 may enter a user search term associated with a customer.

The search results displayed contains heavy text data that are cumbersome to browse. The common approach to avoid memorizing navigation is to mark these addresses as bookmarks or Favorites within a web browser. In certain cases where the data inside programs is not available at a fixed location as indicated by its address such as a URL, where the programs consist of dynamically rendered page (in a session) with a series of data transformations and layouts. Also, the data shown in search results may not be up-to date due to a lack of real time indexing of the content by the search engine.

There is also a situation where the user searches for something and is shown too many results 304 as shown in FIG. 3A or no results 306 as shown in FIG. 3B. This could be due to a poor description or user inputted search term OR the search term is very broad leading to a very large number of matches. Often in such situations, the solution is to offer suggestions under the common 'Did you Mean' title where the user is presented alternative spelling for the user inputted terms or a related set of synonyms for that search term available in a ready reference such as a static thesaurus. The user may not find these suggestions relevant to his or her intention.

In short, there lies a problem for users of a network information system to effectively and efficiently access and utilize the data and applications associated with that data available on that particular network information system. Users have to typically acquire and memorize the location and use of web service applications in order to use them.

SUMMARY

In view of the foregoing, an embodiment herein provides a dynamic portal generation system that includes an indexing module that indexes structured and unstructured data in a database. The database includes information from associated standalone applications having a plurality of documents from a plurality of information sources, and a name-entity repository. The name-entity repository includes a plurality of name entities and their corresponding name-entity types. A search module searches the information from the created index of information from associated standalone applications to obtain a search result based on a search query. A name-entity extraction module extracts a matching name-entity from the search result that corresponds to a name-entity in the name-entity repository. An information portal generation module dynamically generates a portal triggered by the search query. The portal generation module includes a search result segmentation module that aggregates the search result by a type or a source to form a plurality of search result segments, a portlet generation module, a subset of the overall information portal, that renders data extracted from at least one of the search result segments in a corresponding format, and an action module that integrates relevant actions corresponding to at least one of the search result segments and displays at least one actionable portlet that enables the user to perform additional operations on the information using associated standalone applications.

The portal generation module renders the portal based on a predefined template that corresponds to the name-entity or the name-entity type deduced from the given search query. The search module includes a result categorization module that determines whether a number of documents returned in response to the search query is zero, within an optimal range, or in excess of the optimal range. The search module further includes a related result reference module that refers to other sources to find related results when the number of documents returned in response to the search query is zero. The search module further includes a text clustering module that extracts text clusters from top ranked documents in the search result when the number of documents returned in response to the search query is in excess of the optimal range, and a search term suggestion module that suggests at least one alternate search term based on the text clusters and updates the index with an alternate search term that is selected by the user.

The search module displays search results that obtain top ranked results when the number of documents returned in response to the search query is within an optimal range. The action module displays a link that displays additional information relevant to the matching name-entity from the information from associated standalone applications when the link is clicked by the user. The action module processes an input from the user in relation to at least one parameter and displays additional information from the associated standalone applications corresponding to the parameter in response to the input. The format is at least one of a table, a graph, a chart, a dialog box, a list, a paragraph and a drop down menu. The database further includes a thesaurus that includes a hierarchical structure of the plurality of name entities, and the portal generation module displays a corresponding hierarchical structure of the matching name-entity retrieved from the thesaurus based on the search query. The information from associated standalone applications further includes a plurality of records and a plurality of user permissions.

In another aspect, a method for automatically generating a dynamic portal triggered by a search query in dynamic portal generation system is provided. The dynamic portal generation system includes an indexing module that indexes structured and unstructured data in a database. The database includes an information from associated standalone applications having a plurality of documents from a plurality of information sources, and a name-entity repository. The name-entity repository includes a plurality of a name entities and their corresponding name-entity types. The method includes searching the indexed information from applications to obtain a search result based on a search query from a user, extracting matching name entities from the search result that corresponds to a name-entity in the name-entity repository, aggregating the search result by a type or a source to form a plurality of search result segments, rendering a data extracted from at least one of the search result segments in a corresponding format as a portlet, integrating relevant actions corresponding to at least one of the search result segments, and displaying at least one actionable portlet that enables the user to perform additional operations on the information.

It may be determined whether a number of documents returned in response to the search query is zero, within an optimal range, or in excess of the optimal range. Other sources may be referred to find related results when the number of documents returned in response to the search query is zero. The method further includes extracting text clusters from top ranked documents in the search result when the number of documents returned in response to the search query is in excess of the optimal range, suggesting at least one alternate search term based on the text clusters, and updating the index with an alternate search term that is selected by the user. The database further includes a thesaurus that includes a hierarchical structure of the plurality of name entities. A corresponding hierarchical structure of the matching name-entity retrieved from the thesaurus is displayed based on the search query. The dynamic portal is rendered based on a predefined template that corresponds to either a name-entity or a name-entity type of the matching name-entity based on the user given query.

In yet another aspect, a non-transitory program storage device having an indexing module that indexes structured and unstructured data in a database is provided. The database includes an information from associated standalone applications includes a plurality of documents from a plurality of information sources, a plurality of records, a plurality of user permissions, a name-entity repository that includes a plurality of name entities and their corresponding name-entity types, a thesaurus that includes a hierarchical structure of the plurality of name entities, and a set of instructions that when executed by a processor, perform a method for automatically generating a dynamic information portal triggered by a search query in dynamic portal generation system. The method includes searching the information from associated standalone applications to obtain a search result based on a search query from a user, extracting a matching name-entity from the search result that corresponds to a name-entity in the name-entity repository, aggregating the search result by a type or a source to form a plurality of search result segments, rendering the dynamic portal based on a predefined template that corresponds to the name-entity or a type of the name-entity, displaying a corresponding hierarchical structure of the matching name-entity retrieved from the thesaurus based on the search query, rendering a data extracted from at least one of the search result segments in a corresponding format as a portlet, integrating relevant actions corresponding to at least one of the search result segments, displaying at least one actionable portlet that enables the user to perform additional operations on the information from associated standalone applications, and processing an input from the user in relation to at least one parameter and displaying additional information from the information from associated standalone applications corresponding to the parameter in response to the input from the user. A link that displays additional information relevant to the matching name-entity from the information from associated standalone applications is displayed when the link is clicked by the user. The format is at least one of a table, a graph, a chart, a dialog box, a list and a drop down menu.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a block diagram illustrating the dynamic portal generation system that creates portal in real-time to provide for organized and real time updated information, and associated actions related to the information being searched for.

FIG. 9A and FIG. 9B illustrate user interface views of the structured data and the unstructured data of FIG. 6 according to an embodiment herein;

FIG. 11 illustrates a user interface view of a portal associated with a single customer of FIG. 10 according to an embodiment herein;

DETAILED DESCRIPTION OF PREFERRED EMBODIMENTS

Figure 1:
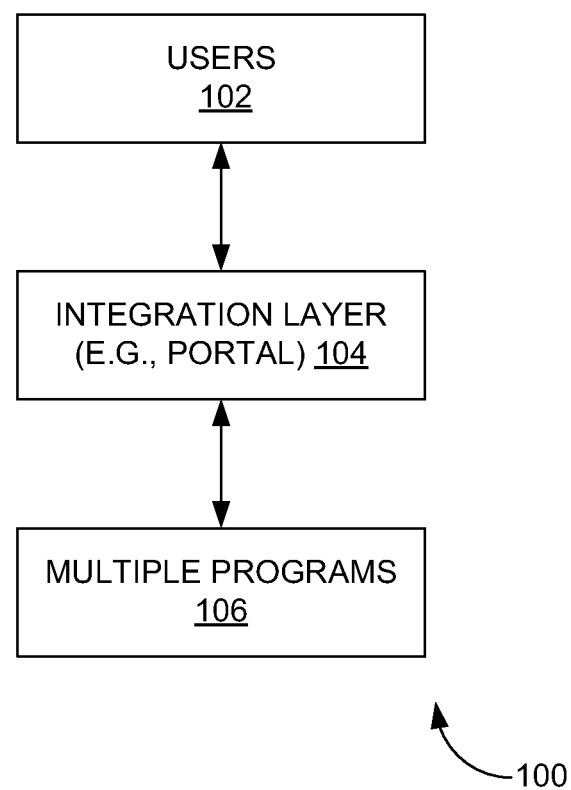
FIG. 1 illustrates a system view of users communicating with multiple programs through an integration layer via a network.
Figure 2:
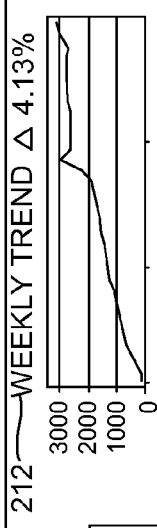
FIG. 2 illustrates a user interface view of a portal associated with a customer.
Figure 3A:
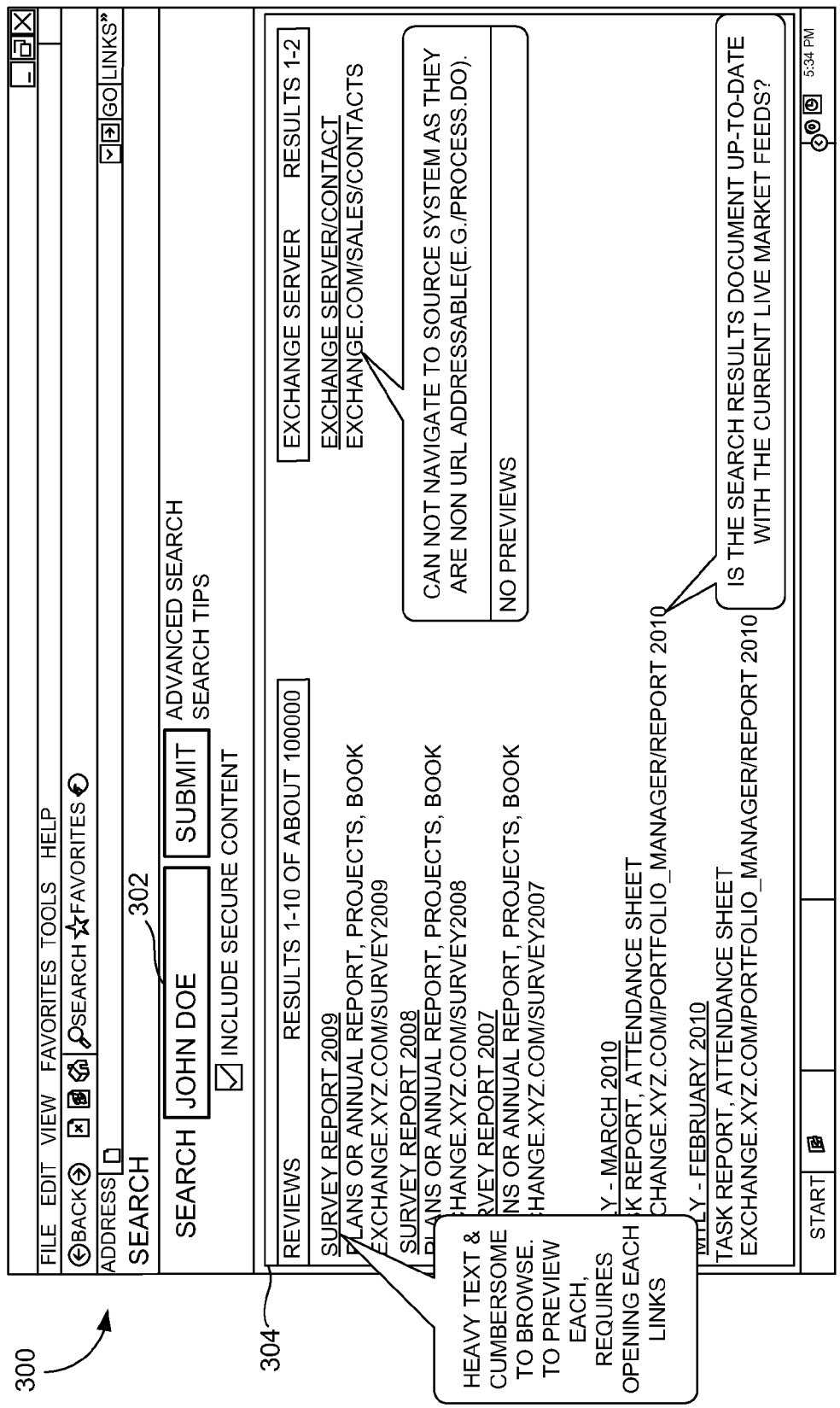
FIGS. 3A-3B illustrates a user interface view of a search associated with a customer profile.
Figure 3B:
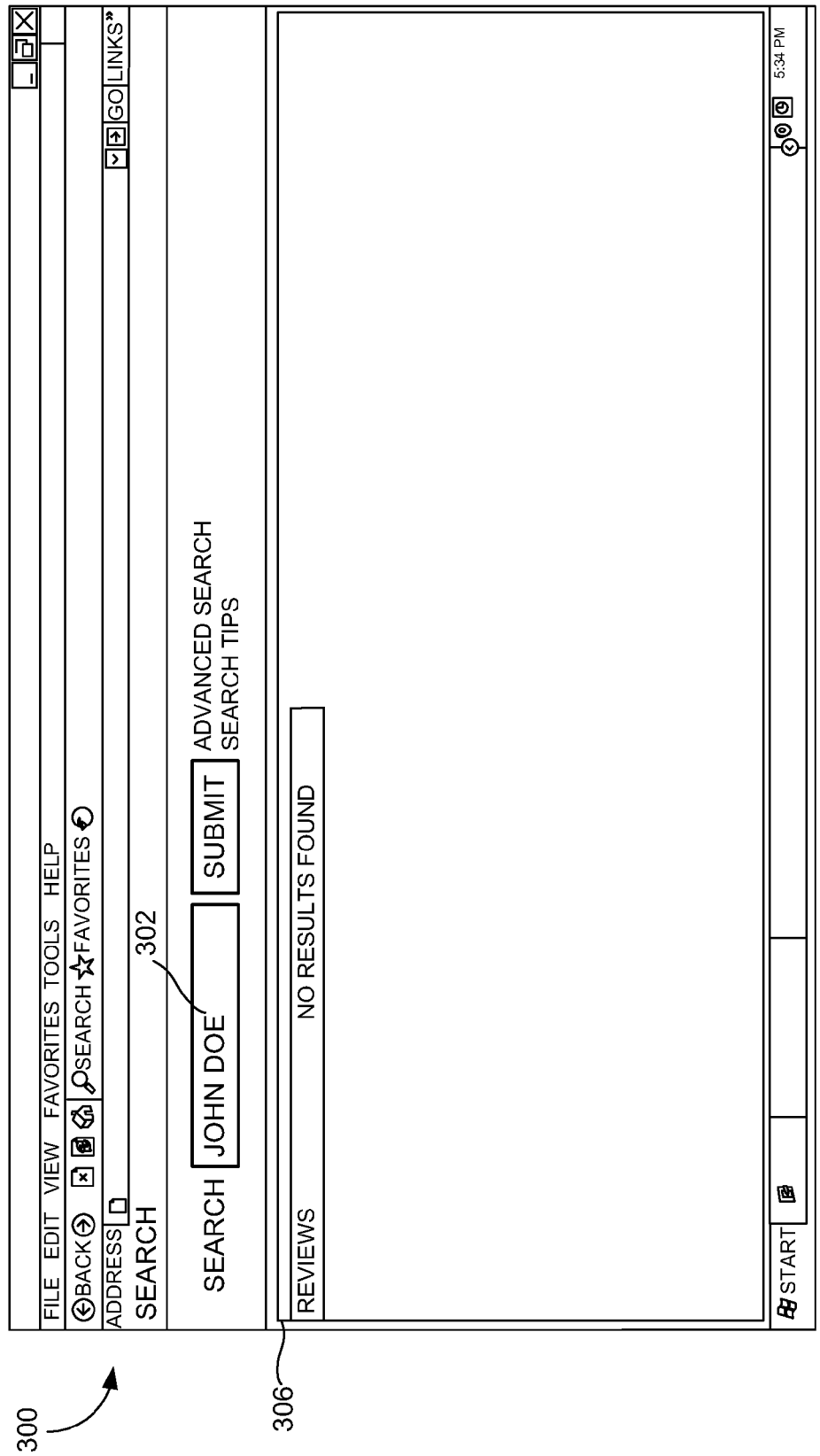

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new tool to access multiple programs on a single platform. The embodiments herein achieves this by providing dynamic integration of multiple programs using service oriented architecture. Also by assembling the dynamically generated portal page using the search engine to obtain the business entities through which multiple programs are obtained based on the user data sources. Referring now to the drawings, and more particularly to FIG. 4 through FIG. 14, where similar reference characters denote corresponding features consistently throughout the figures, there are shown preferred embodiments.

Figure 4:
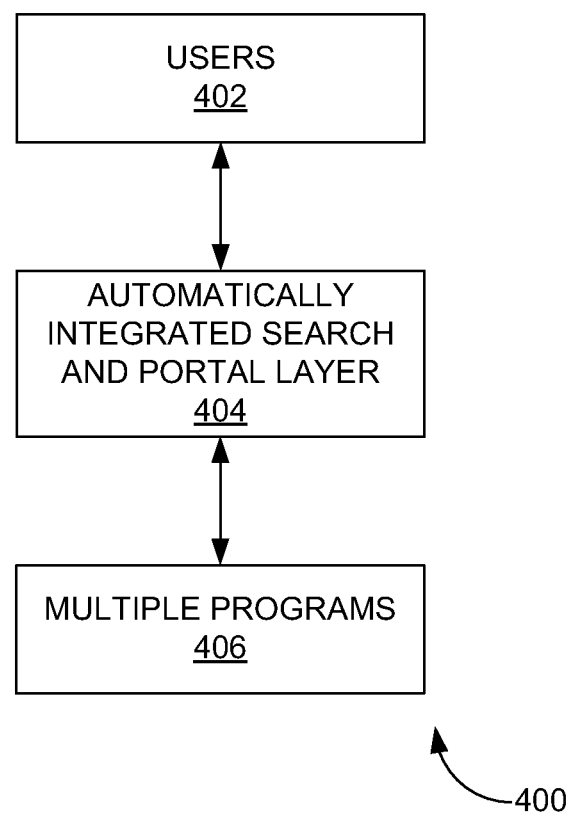
FIG. 4 illustrates a system view of users communicating with various programs through an automatically integrated search and portal layer according to an embodiment herein.

FIG. 4 illustrates a system view 400 of users 402 communicating with various programs 406 through an automatically integrated search and portal layer 404 according to an embodiment herein. The users 402 access the multiple programs 406 through the search and portal layer 406. The automatically integrated search and portal layer 404 integrates one more programs based on a user's interest and allows the user 402 to search for a user search term and generates a portal for the users 402 based on the search query.

Figure 5:
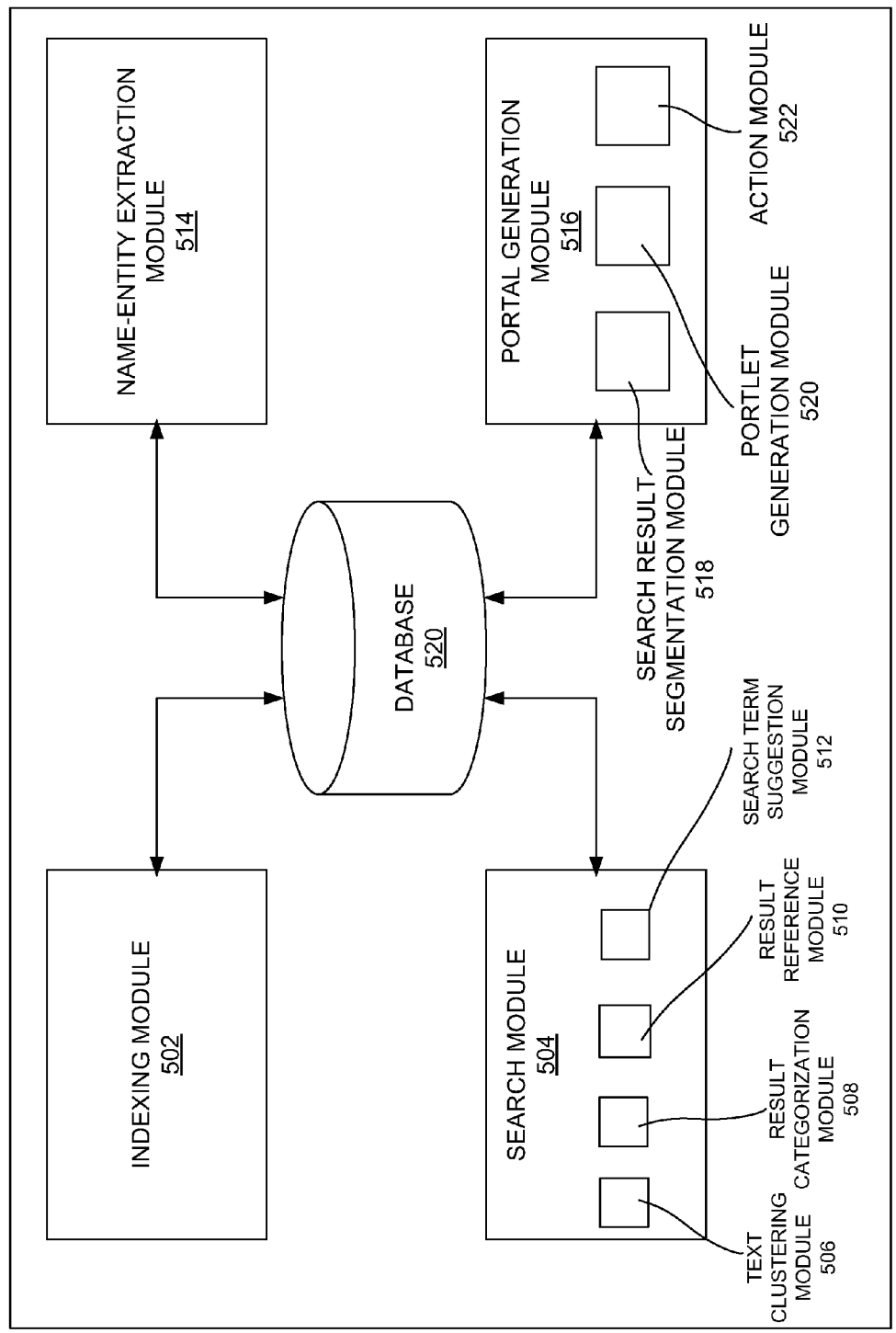

FIG. 5 shows a system view of dynamic portal generation system. The dynamic portal generation system includes an indexing module 502, a search module 504 comprising a text clustering module 506, result categorization module 508, a result reference module 510 and a search term suggestion module 5012, a name entity extraction module 514 and a portal generation module 516 comprising a search result segmentation module 518, a portlet generation module 520 and an action module 522.

Figure 6:
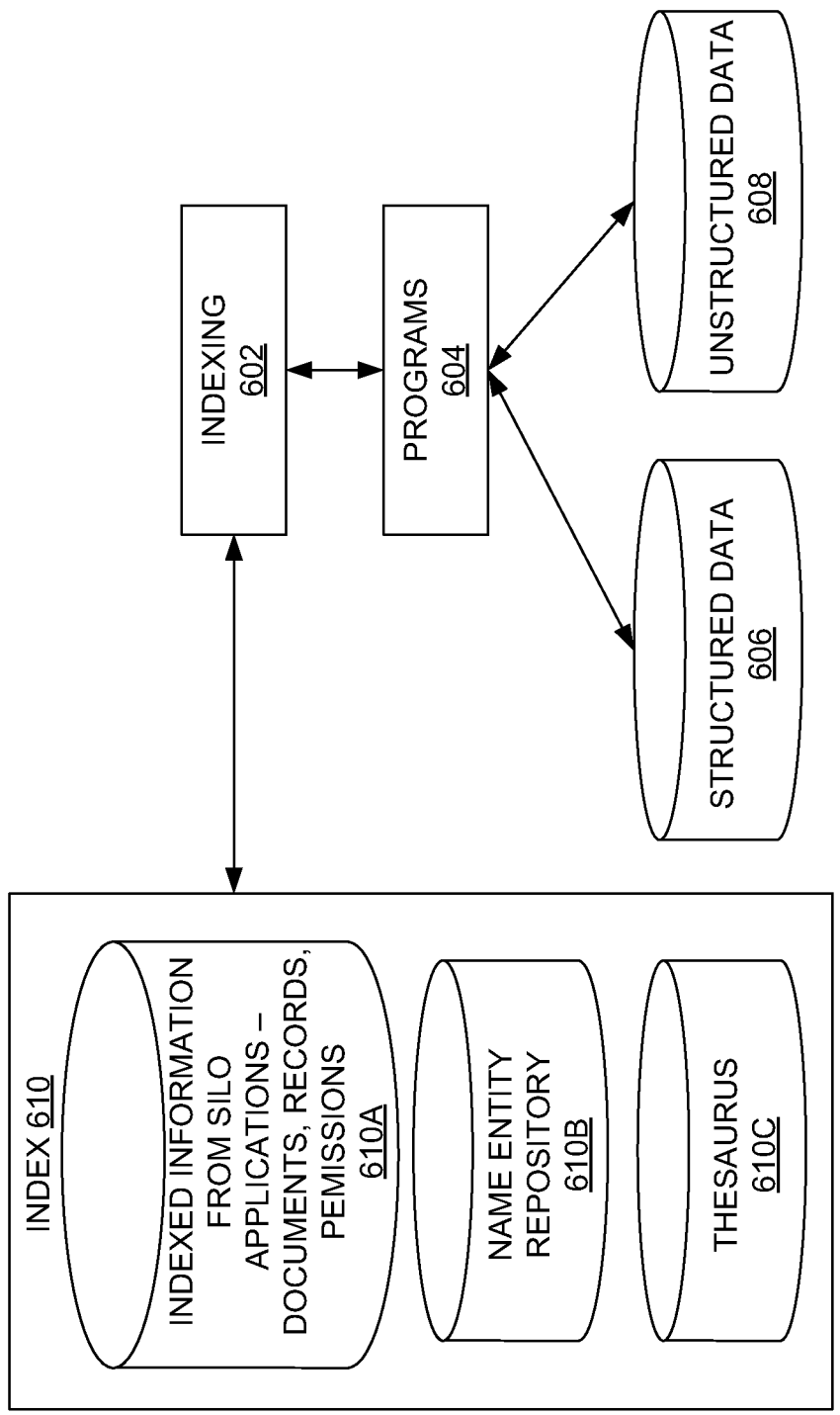
FIG. 6 is an exploded view of indexing module shown in FIG. 5 illustrating indexing of structured and unstructured data in an index.

The indexing module 502 indexes the data on a network to form an index which is described below (FIG. 6). The search module 504 performs the function of obtaining search results for a search query, in which the text clustering module 506 is used to extract text clusters from returned search results to facilitate improvisation in search results if the search results obtained are not in an optimal range. Result categorization module 508 determines whether the search result is within an optimal range, exceeding optimal range, or no result. The result reference module 510 refers the search query to other sources for performing search to find relevant search result from other sources. Search term suggestion module 512 provides alternate search terms to a user. Search module 504 is further described in description for FIG. 8. The name entity extraction module 514 is used to extract name entities from returned search result to find relevant data associated to particular name entity for which the user seeks information on the network. The portal generation module 516 generates dynamic portals for searched name entity on the fly to provide real time information associated to that name entity and provide access to different actions that can be performed on associated information to the name entity. The search result segmentation module 518 aggregates the search result and segments them based on the type and source of information that the search result returns when a search is made. The portlet generation module 520 performs the function of rendering name entity related information in form of portlets in a portal. This module calls the information from index of information from associated standalone applications to render the data required. The action module 522 integrates the portlets using service oriented architecture methods with actions that a user can perform on the information associated to the name entity for which the portal is displayed.

FIG. 6 is a block diagram illustrating indexing module of FIG. 5. FIG. 6 illustrates a structured data 606 and unstructured data 608 being indexed in a database with help of a set of programs 604 according to the embodiment herein. The block diagram also includes an indexing block 602 where it communicates with a index block 610 that includes information from associated standalone applications 610A, a name entity repository database 610B and a thesaurus database 610C. The database 610A contains documents, records, user permissions and user search terms or user inputted search terms. The documents may be associated with any of a user, or a customer profile. The user permissions include set of data that consists of which user 402 has permissions to access the documents, records, programs, etc. The indexing block 602 collects, parses, and stores data to form an index to facilitate fast and accurate data retrieval. The indexing block 602 also maintains the up-to-date index of all the documents records, and programs that are accessed by the users 402 using various user search terms.

The set of programs 604 contain both the structured data 606 and the unstructured data 608. The structured data 606 are organized, whereas unstructured data 608 may be of any type that may not have a specific format. (e.g., text, and images that are not organized). The index 610 helps to optimize speed and performance in finding relevant documents for a search query (e.g., using user search terms), thus reduces the time in finding relevant documents and provides easy search of the documents and/or other data that the user 402 seeks. The name entity repository database 610B contains names of the entities such as customer, employee, product, vendor, company, etc. The thesaurus database 610C contains hierarchical relationships extracted from organized data associated with various data in the Computer Network.

Figure 7:
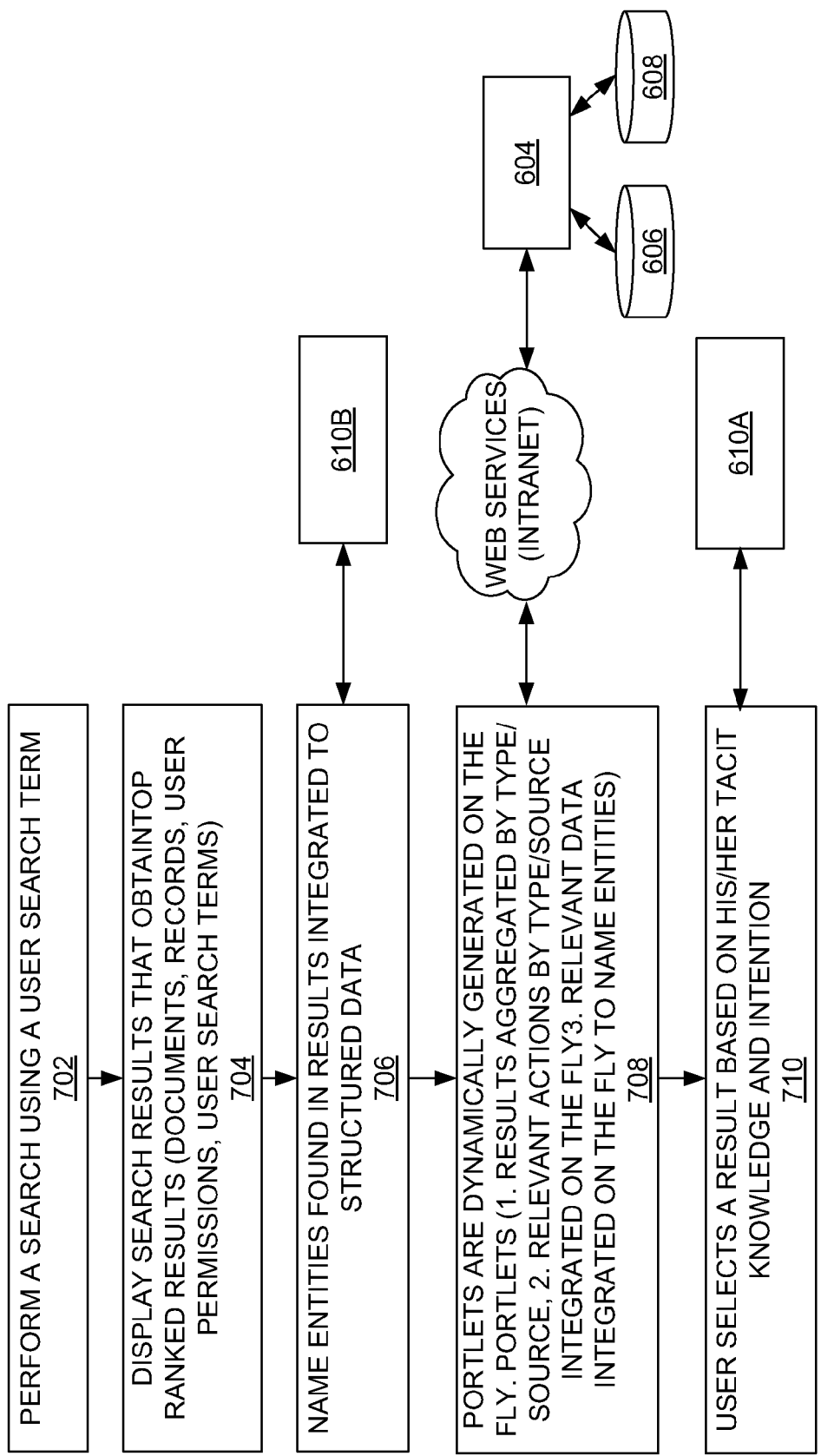
FIG. 7 illustrates a flow diagram of users of FIG. 4 performing a search and viewing the results obtained based on the search result displayed according to a second embodiment herein.

FIG. 7 illustrates a flow diagram of users 402 of FIG. 4 performing a search and viewing the results obtained based on the search result displayed according to a second embodiment herein. In step 702, the users 402 perform a search using a user search term or a user search term or a combination of user search terms. In step 704, the search result obtains and/or displays a top ranked results that are associated with the user search terms that the user 402 seeks. In one embodiment, the search results are a collection of artifacts such as documents, records along with the user permissions, and the user search terms. In step 706, name entities are found (if any based on the user search term) in the results obtained that are continuously being indexed using the name entity repository database 610B.

In one embodiment, structured data 606 and unstructured data 608 are indexed with the help of a set of programs into the index 610. The indexing is done to form three types of indexes in the index block. Indexing firstly creates an index of information from the associated standalone applications 610A, which contains the documents, records, permissions, etc and associated name entities. Secondly, a name entity repository 610B is built which contains the information about existing name entities and their classification. Thirdly, there also can be integrated a thesaurus 610 to the index, to provide the user with the hierarchy to which the searched name entity belongs.

In step 708, portlets are generated on-the-fly (e.g., automatic integration of data/programs). In one embodiment, portlets are generated based on results aggregated by type/source. In another embodiment, portlets are generated based on the relevant actions by type/source integrated on-the-fly. In yet another embodiment, portlets are generated based on the relevant data integrated on-the-fly to the name entities.

The portlets are built using the programs through service oriented architecture methods. Based on the user search term/user search terms, relevant structured data is retrieved from the various programs and portlets are created on-the-fly. In step 710, the users 402 selects a result (e.g., a document, a record) by clicking on the relevant data he/she seeks based on his/her tacit knowledge and/or intention. There can also be maintained a user search term database along with index to facilitate users with alternate search term related to name entity. This database holds an index of search terms which can be updated continuously. Whenever a user creates a search for any query that query is added in the user search term database. Selection of any alternate search term by the user is recorded in the index which makes it available at step 704 while computing results in a similar context where yet another user is searching for the same term or related term. This method of tagging user searches and making it available to other searches conducted for similar terms, helps users differentiate among multiple choices in the results.

Figure 8:
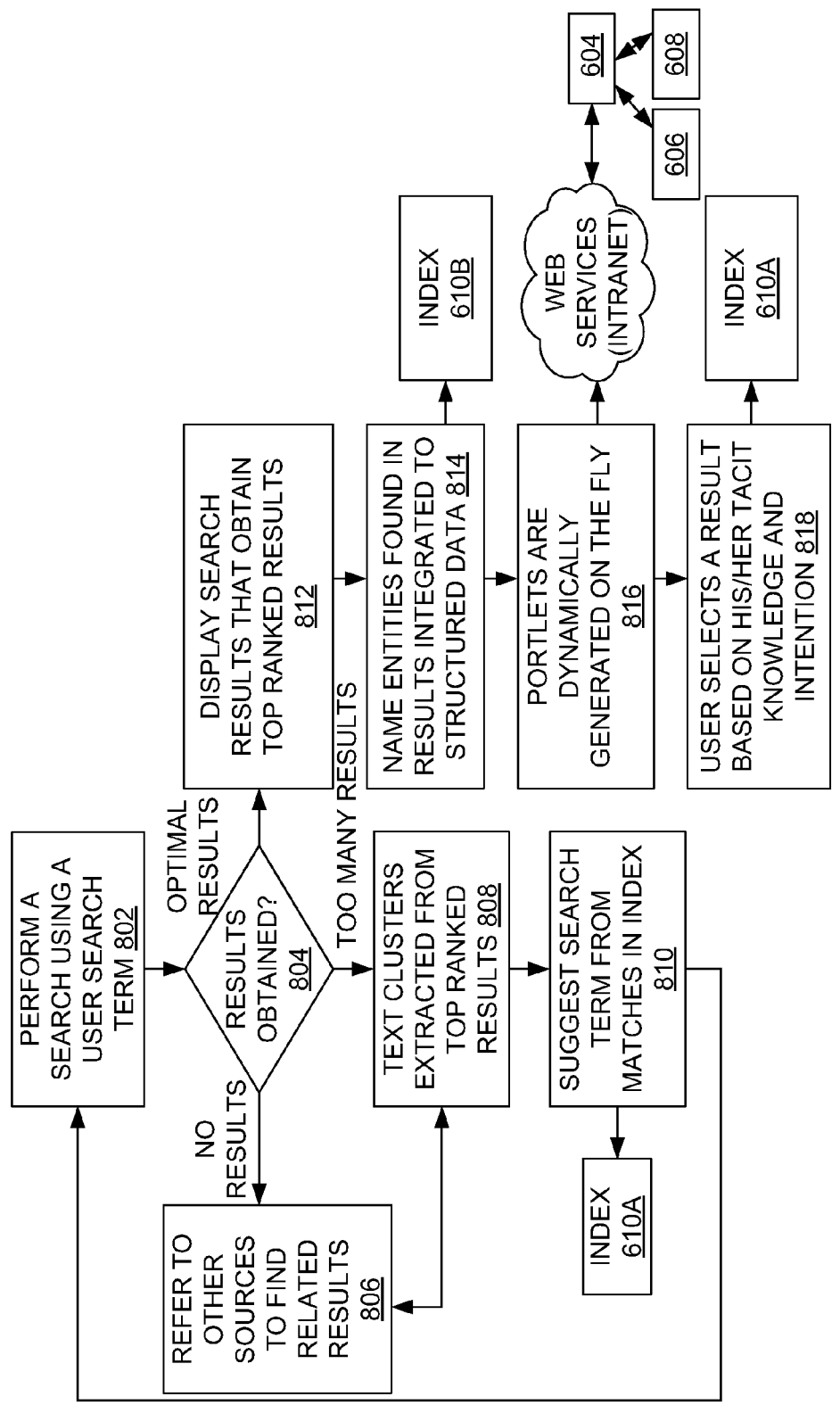
FIG. 8 illustrates a flow diagram of users of FIG. 4 performing a search and viewing the results obtained based on the search result displayed according to a second embodiment herein.

FIG. 8 illustrates a flow diagram of users 402 of FIG. 4 performing a search and viewing the results obtained based on the search result displayed according to a second embodiment herein. In step 802, the users 402 perform a search using a user search term or a user search term or a combination of user search terms. In step 804, it is checked whether there are optimal results, no results, or too many results. If there are too many results obtained text clusters are extracted from top relevant results obtained in the search results in step 808. If, there are no results obtained from the search results, then a search is referred to other sources (e.g., such as World Wide Web (WWW), or any other source) to find related results in step 806 and then step 808 is repeated.

In step 810, it is suggested to match the text clusters that are extract with the search term that are in the index and step 802 is repeated. If there are optimal results obtained in the search results, then a top ranked results that are associated with the user search terms or user search terms that the user 402 seeks are displayed to the users 402 in step 812. In one embodiment, the optimal search results are collection of artifacts such as documents, records along with the user permissions, and the user search terms. In step 814, name entities are found (if any based on the user search term) in the results obtained which are continuously indexed using the name repository database 610B.

In step 816, portlets are generated on-the-fly. The portlets are built using the programs (the structured data) through service oriented architecture methods. Based on the user search term/user search terms, relevant structured data is retrieved from the various programs and portlets are created on the fly. In step 818, the users 402 selects a result (e.g., a document, a record) by clicking on the relevant data he/she seeks based on his/her tacit knowledge and/or intention. The data selected by the users 402 to view may be structured data or unstructured data and are indexed based on the user search terms or user search terms.

Figure 9B:
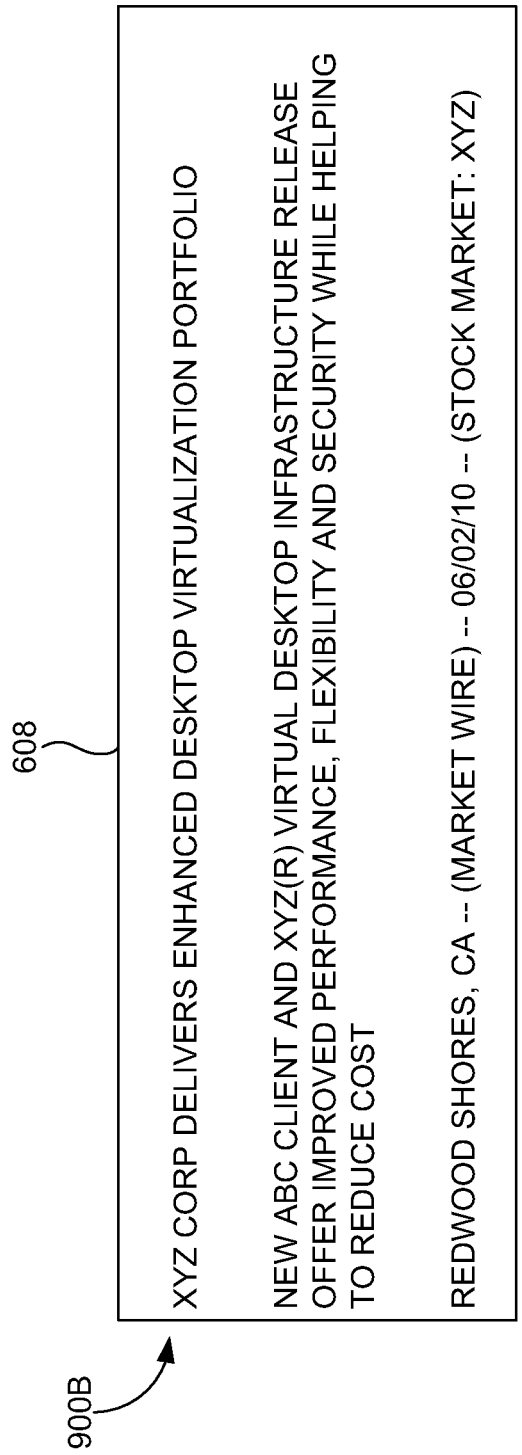

With reference to FIG. 5, FIG. 6, FIG. 9A and FIG. 9B, illustrates user interface views 900A-900B of the structured data 606 and the unstructured data 608 of FIG. 6 according to an embodiment herein. The user interface view 900A of FIG. 9A illustrates a structured data that includes a name entity field 902, an industry field 904, a founders field 906, a shareholders field 908, an exchange field 910, a ticker field 912, a phone number field 814, a fax field 916, and a website field 918. The name entity field 902 displays a name of an employee, a vendor, a customer, and/or a company (e.g., XYZ CORP) that is extracted from the name entity repository database 610B. The industry field 904 displays the type of industry or the activities that the entity (XYZ CORP) is associated with (e.g., Software Publishers, Computer Related Services, Prepackaged Software, Computer Training, Computer Systems Design Services, Computer software.

The founders field 906 displays the owner(s) (e.g., Thomas Andrew, Mark Anthony) of the entity (XYZ CORP). The shareholders field 908 displays the name of the member who has share or holds shares in the entity (XYZ CORP). The exchange field 910 displays the details of an entity (e.g., stock market) that the entity is engaged. The ticker field 912 displays a short form of the entity (e.g., XYZ). The phone number field 914 displays the contact details (e.g., (650) 506-7000) of the entity (XYZ CORP). Similarly, the fax field 916 displays the facsimile details (e.g., (650) 506-7200) of the entity. The website field 918 displays the website link (e.g., a URL of the entity www.xyz.com). The users 402 may visit the website for additional data that he/she seeks by browsing the entity website.

The user interface view 900B of FIG. 9B displays the unstructured data (e.g., may be an activity performed by the entity (XYZ CORP) and other such additional data associated with the entity (XYZ CORP). The additional data may include stock market data, or contact details, etc.

Figure 10:
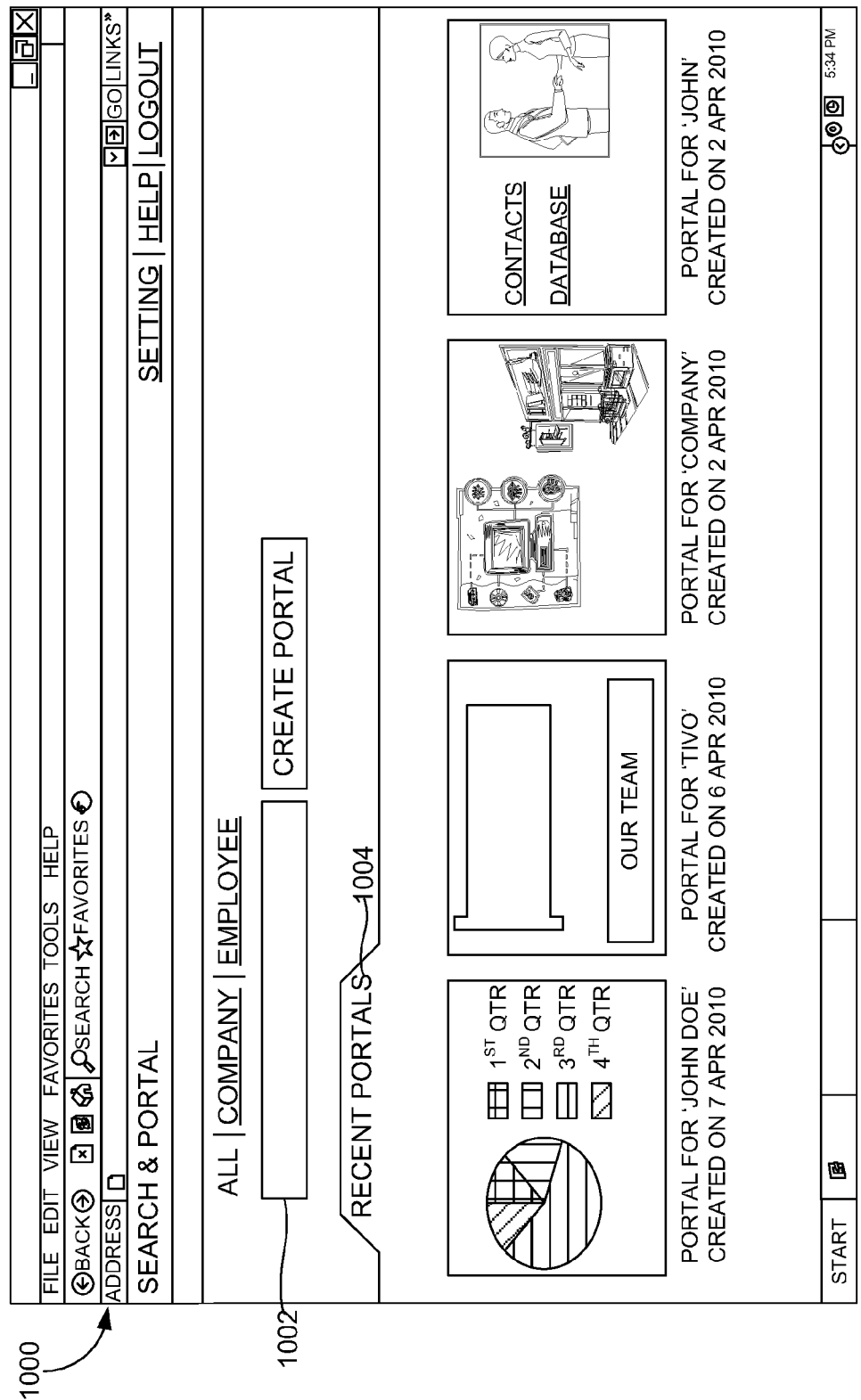
FIG. 10 illustrates a user interface view of the automatically integrated search and portal layer of FIG. 4 according to an embodiment herein.

FIG. 10 illustrates a user interface view 1000 of the automatically integrated search and portal layer 406 of FIG. 4 according to an embodiment herein. The user interface includes a search field 1002, and a recent portals field 1004. The search field 1002 allows the users 402 to search for a customer and data associated with the customer. In one embodiment, the users 402 may perform a search by entering text data based on at least one of a category. In another embodiment, the category may include a company, an employee, and/or a combination of company and employee, etc.

The users 402 may perform a search by entering a user search term (or multiple user search terms) to obtain data associated with a customer. The portals are dynamically generated based on a user search term search performed by the users 402. The portals are generated and displayed to the users 402 when the users 402 enter a user search term to perform a search and click on the Create Portal as shown in FIG. 10. The recent portals field 1004 displays the recent and most popular portals that are viewed by the users 402. In one embodiment, the users 402 may perform a user search term search for obtaining a portal and/or may view the recent and most popular portals associated with a customer.

Figure 11:
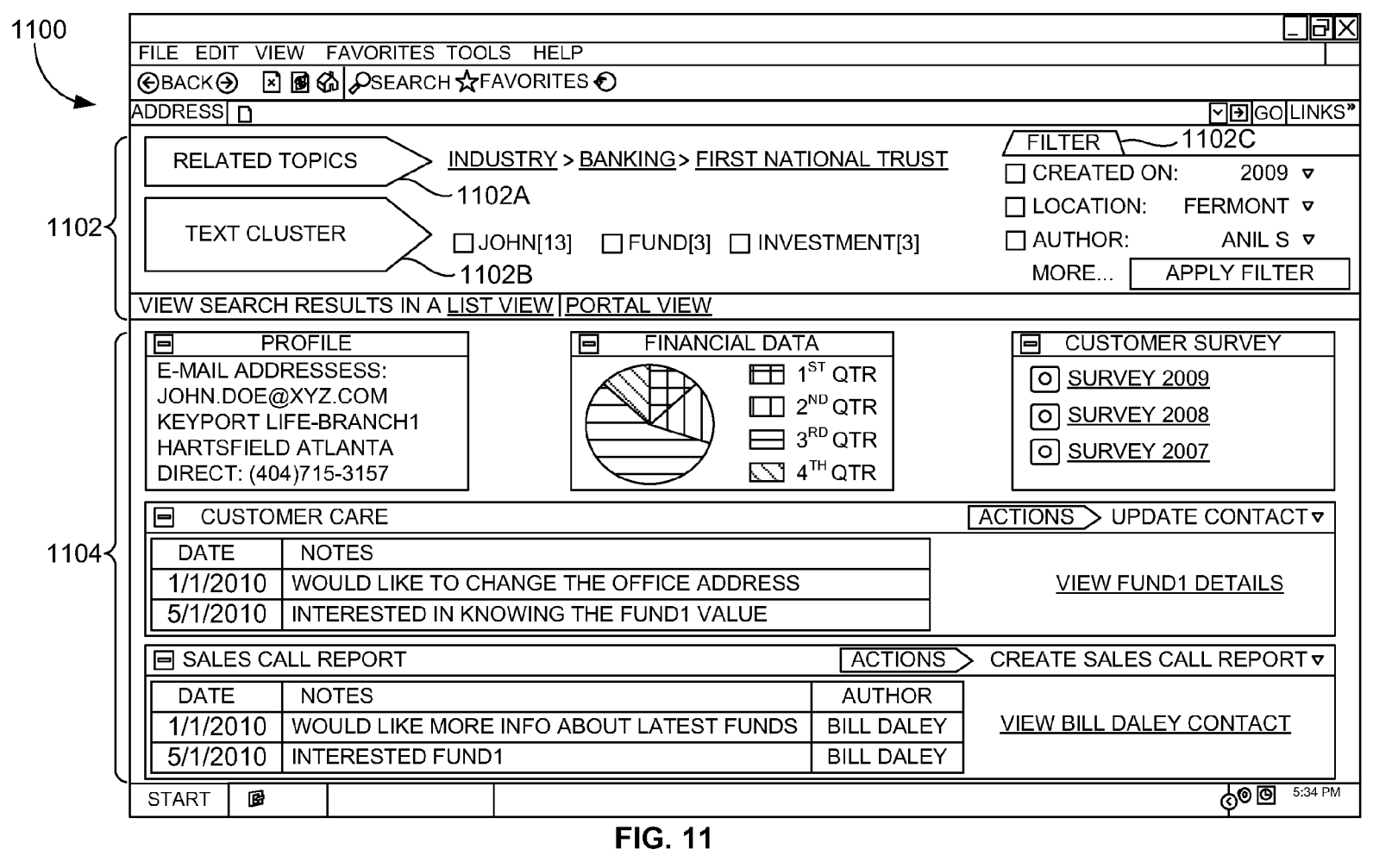

FIG. 11 illustrates a user interface view 1100 of a portal associated with a single customer of FIG. 10 according to an embodiment herein. The user interface view of the portal a navigational aids field 1102 and the portlets field 1104. The navigational aids field 1102 includes a related topics field 1102A, a text clusters field 1102B, and a filter field 1102C. The related topics field 1102A includes the topics associated with the customer related to a specific category. For example, the users 402 may search for a particular customer data in industry with category as banking and second category as first national trust. The text clusters field 1102B such as the user search terms and the activities the customer is involved in. For e.g., the users 402 may perform a user search term search or a multiple user search term search. In one embodiment, when the users 402 perform multiple user search term search, then text clusters may include one more user search terms such as John Doe (e.g., customer), fund, investments, etc as shown in FIG. 11. In the situation that there are too many results or no results, similar text clusters 808 are extracted from the available results or additional results from alternative sources. The filter field 1102C allows the users 402 to perform a filter based on his/her requirements. For e.g., if the user 402 requests for documents created in year 2009 for a particular location, by an author (e.g., Anil S), then clicks on the apply filter, the results are filtered according to the user's interest as shown in FIG. 11.

The portlets field 1104 provides a user interface view of a customer details based on the search performed by the user 402. The user interface view of the customer details include a profile, financial data (e.g., first quarter, second quarter, third quarter, and a fourth quarter), customer care details including emails, attachments, and/or notes, a customer survey details, and a sales call report details including documents associated with an author, etc. associated with a particular customer (e.g., John Doe). The customer care details may further include fund details and an action button that allows updating of contact data associated with the customer. The sales call report may further include an action button that allows the users 402 to create an action item (e.g., create a sales call report). The users 402 may further view details of the author (e.g., Bill Daley contact) as shown in FIG. 11. The user 402 may also view customer survey details by clicking on the attachments (e.g., survey report 2007, survey report 2008, and survey report 2009) for a particular data (e.g., Dallas meet).

Figure 12A:
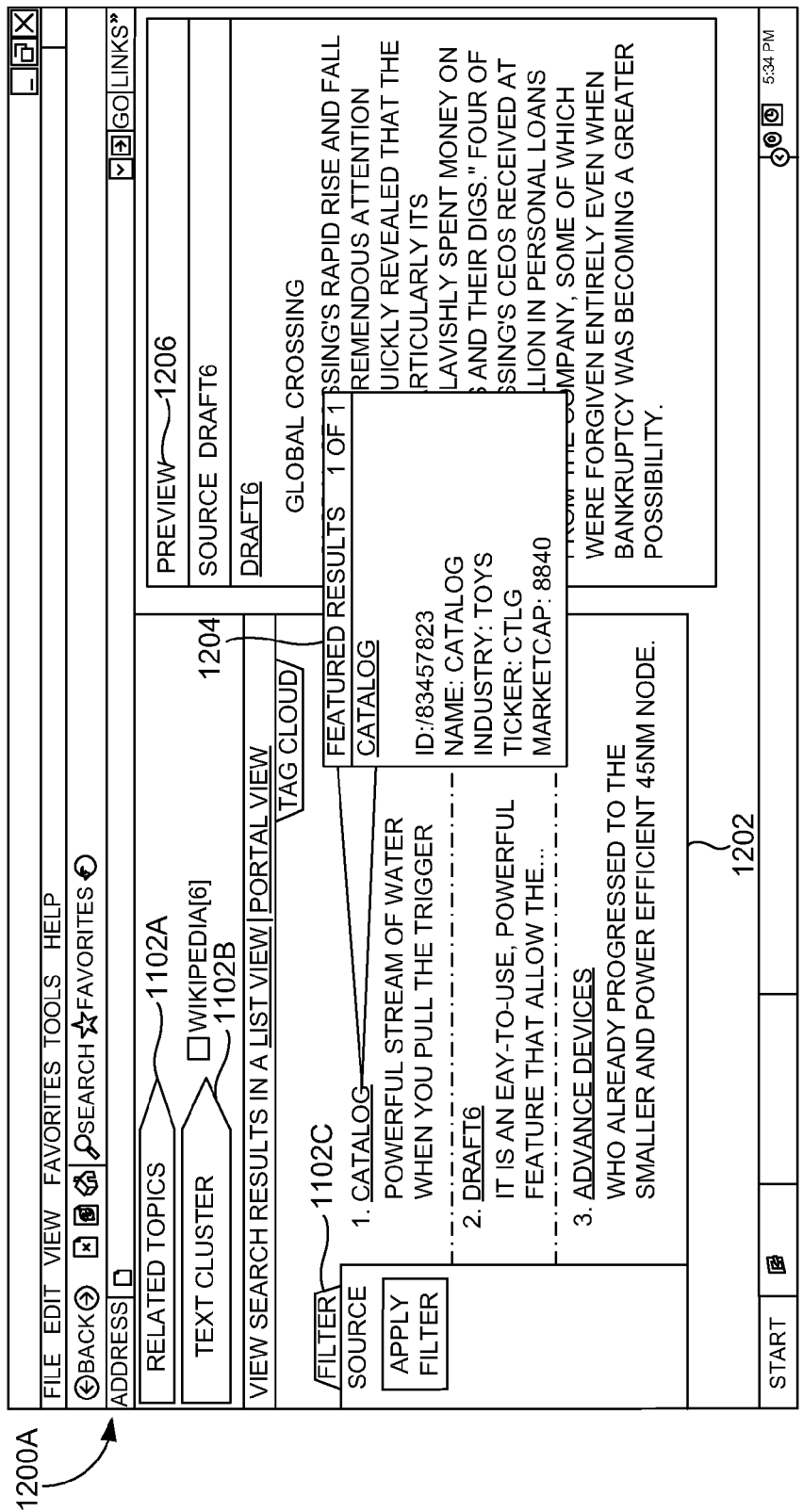
FIG. 12A through FIG. 12C illustrate user interface view of a dynamically generated portal based on a network search according to an embodiment herein.

With reference to FIG. 11, FIG. 12A through FIG. 12C illustrate user interface view 1200A-1200C of a dynamically generated portal based on a network search according to an embodiment herein. The users 402 may perform a similar user search term search and a portal is created that provides with the data, documents, attachments, emails, or URL's that are addressable. The user 402 may navigate through the dynamically generated portal based on the results 1202 retrieved and can mouse over and/or click on the desired result to make a selection and view the corresponding data associated with that result. For example, as shown in FIG. 12A, when the user 402 experiences a mouse over at least one of a document or on a link from the results obtained in the dynamically generated portal (e.g., catalog), a pop up window 1204 pop-ups that provides brief details of that particular link and its content. In one embodiment, when the user 402 clicks on the document (e.g., CONFIDENTIAL DRAFT 6), the dynamically generated portal provides a user interface view with a preview window 1206 containing the data associated with that document. In one embodiment, the user 402 may also view internet content.

Further, the user interface view 1200B of the customer details include a sales performance, company documents, customer requests, sales leads, a profile, and aggregated results. The sales performance including product, sales for year, and a sales chart. The company document includes contact data, founders, share holders etc. The customer request includes product details, purchase order etc. The sales leads include the individual or organizations potentially interested in purchasing a product or services. The profile includes the customer address, email ID, phone number for the specific person (e.g. John Doe). The aggregated results may further include the overall result of the customer purchase or customer sales.

Figure 12B:
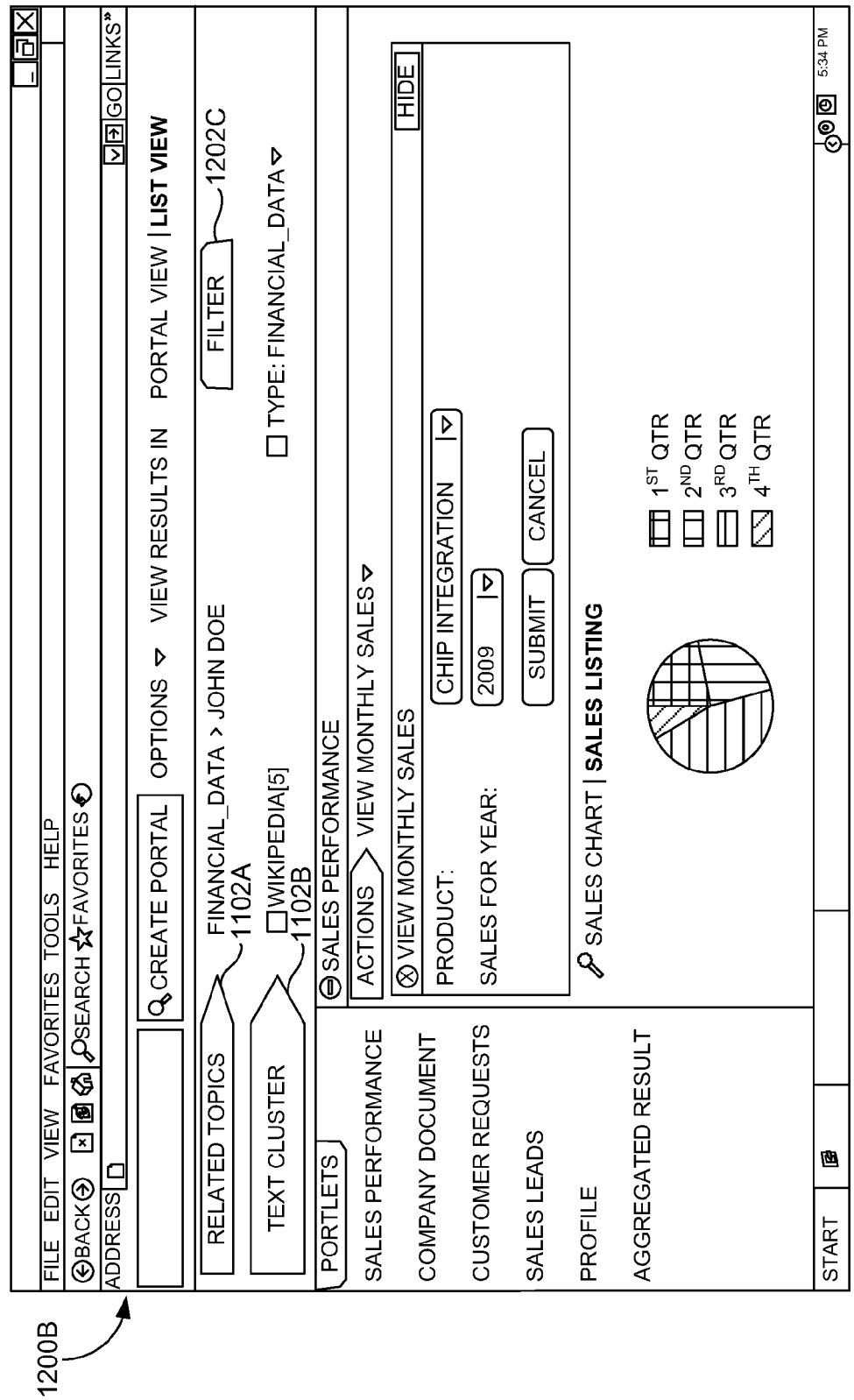
Figure 12C:
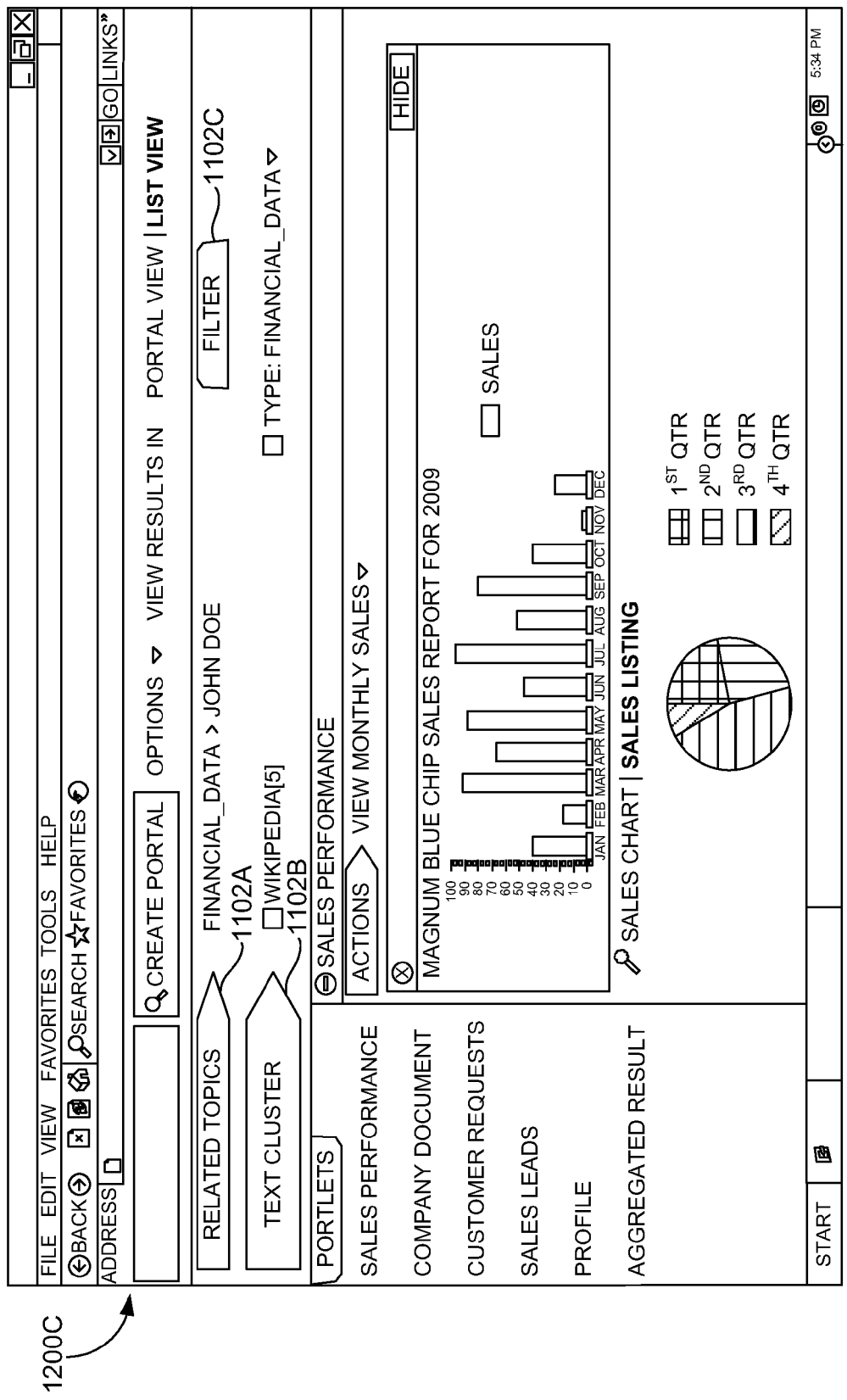

The users 402 when clicks on any of the options available (e.g., a sales performance, company documents, customer requests, sales leads, a profile, and aggregated results) displays details of that particular activity. For example, when the users 402 click on the sales performance, the portal displays with options for an input and to submit. The user 402 inputs the desired data that he/she seeks and submits to view the report. The portal then displays a sales report for a particular year or for particular quarters (as shown in FIG. 12B and FIG. 12C) for the entity (e.g., chip integration).

Figure 13:
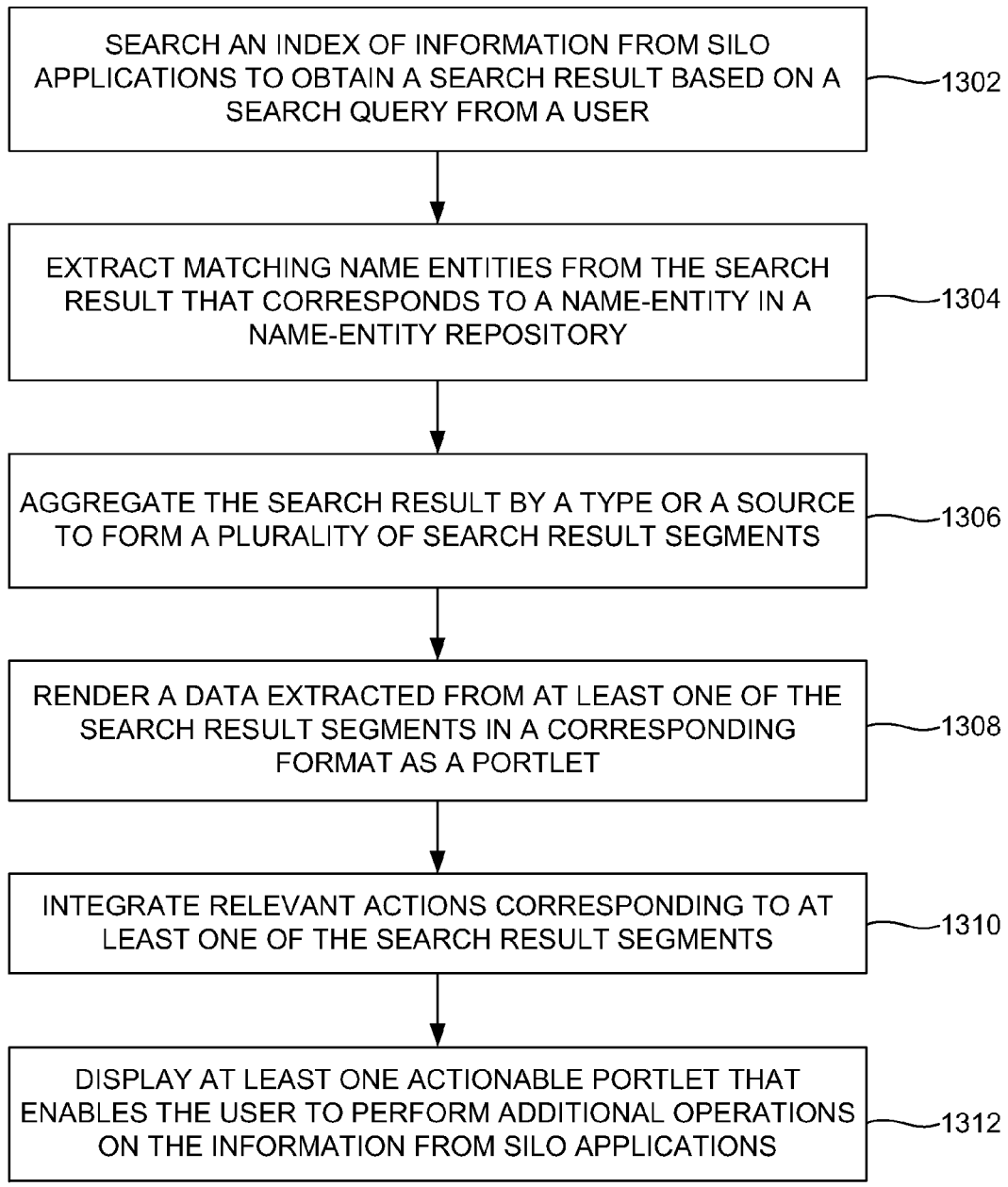
FIG. 13 is a flow diagram illustrating a method for automatically generating a dynamic portal triggered by a search query in dynamic portal generation system according to an embodiment herein.

FIG. 13 is a flow diagram illustrating a method for automatically generating a dynamic portal triggered by a search query in dynamic portal generation system according to an embodiment herein. The dynamic portal generation system includes the indexing module 502 that indexes structured 606 and unstructured data 608 in an index 610. The index 610 includes information from standalone applications having one or more documents from one or more information sources, and a name entity repository 610B. The name entity repository 610B includes one or more name entities and their corresponding name entity types. In step 1302, the information from associated standalone applications is searched to obtain a search result based on a search query from a user. In step 1304, matching name entities are extracted from the search result that corresponds to a name entity in the name entity repository 610B. In step 1306, the search result is aggregated by a type or a source to form one or more search result segments. In step 1308, a data extracted from at least one of the search result segments is rendered in a corresponding format as a portlet. In step 1310, relevant actions corresponding to at least one of the search result segments are integrated. In step 1312, at least one actionable portlet is displayed to enable the user to perform additional operations on the associated standalone application using service oriented architecture methods.

It may be determined whether a number of documents returned in response to the search query is zero, within an optimal range, or in excess of the optimal range. Other sources may be referred to find related results when the number of documents returned in response to the search query is zero. Text clusters are extracted from top ranked in the search result when the number of documents returned in response to the search query is in excess of the optimal range. At least one of an alternate search term is suggested based on the text clusters and other user provided search terms. The index is updated with an alternate search term that is selected by the user. In the situation that no results are found, alternative search terms are suggested by referencing other sources of information such as World Wide Web. The index 610 further includes a thesaurus 610C that includes a hierarchical structure of the one or more name entities. A corresponding hierarchical structure of the matching name entity retrieved from the thesaurus may be displayed based on the search query. The dynamic portal is rendered based on a predefined template that corresponds to either a name entity or a name entity type of the matching name entity.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. The functions performed by various modules described herein may be implemented in other modules or combinations of other modules. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
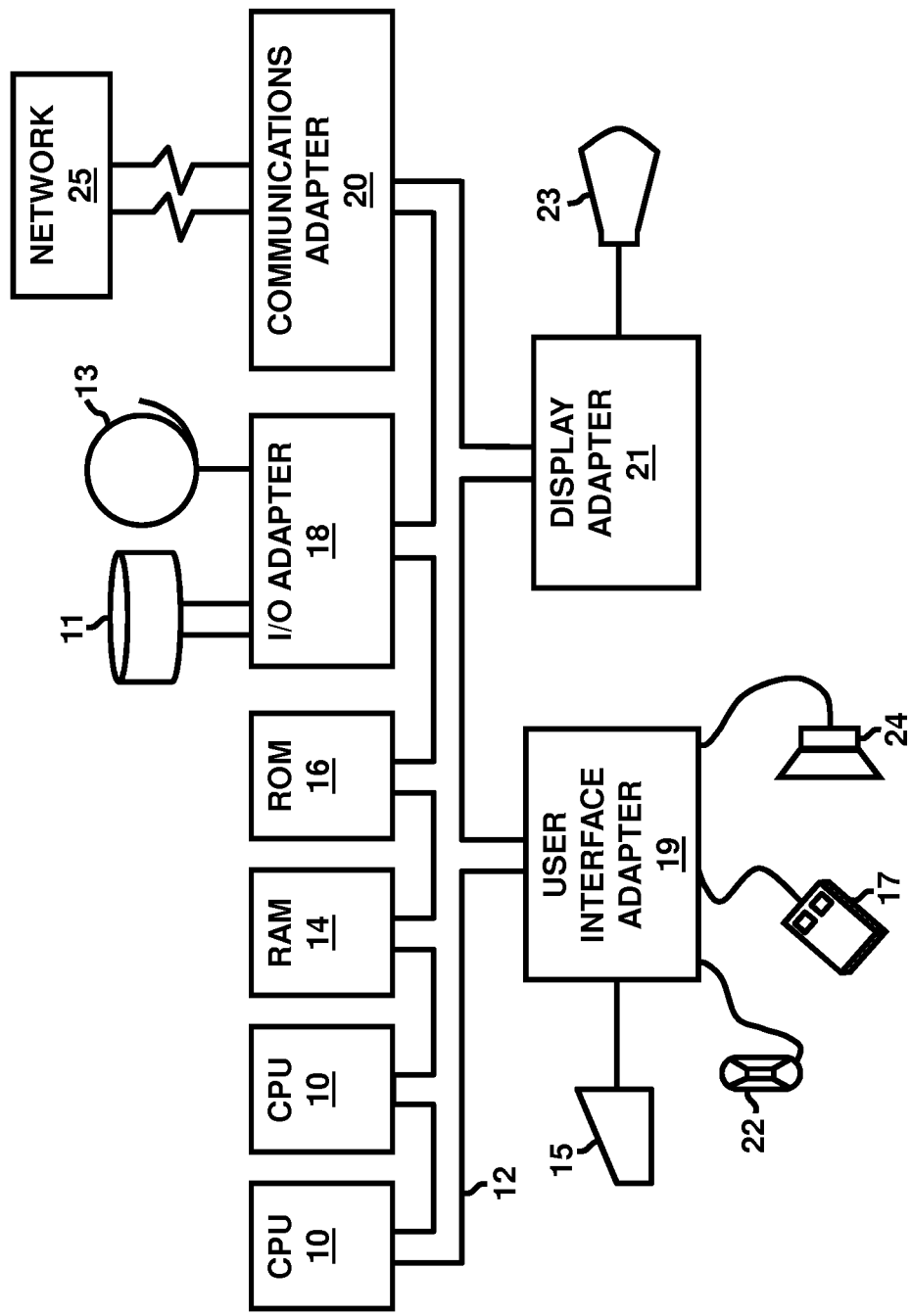
FIG. 14 illustrates a representative computer architecture used in accordance with the embodiments herein.

A representative hardware environment for practicing the embodiments herein is depicted in FIG. 14. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein provide an effective solution to provide users with a dynamic portal which provides with realtime information about the name entities on a network and facilitate access to associated actions on the information. This solution eliminates the hazzles that users have to face in using the network system, such as, memorizing the location and use of associated Standalone applications, remember location of information on a network information system, etc. The solution increases the mobility of user by unifying information retrieval system, i.e. by using a single method of dynamic portal generation system instead of remembering location of information and associated Standalone applications on a network. The solution provides the latest real time information for any name entity searched for in an organized manner.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A dynamic portal generation system comprising:
   a database comprising structured and unstructured data, wherein said database comprises information residing in associated standalone applications comprising a plurality of documents from a plurality of information sources, and a name-entity repository, wherein said name-entity repository includes a plurality of a name entities and their corresponding name-entity types;
   an indexing module executed by a processor that indexes said structured and unstructured data in said database;
   a search module executed by said processor that searches said information from the created index of information residing in associated standalone applications to obtain a search result based on a search query;
   a name-entity extraction module executed by said processor that extracts a matching name-entity from said search result that corresponds to a name-entity in said name-entity repository;
   a portal generation module executed by said processor that dynamically generates an information portal triggered by said search query;
   a search result segmentation module executed by said processor that aggregates said search result by a type or a source to form a plurality of search result segments;
   a portlet generation module executed by said processor that renders data extracted from at least one of said search result segments in a corresponding format; and
   an action module executed by said processor that integrates relevant actions corresponding to at least one of said search result segments and displays, on a display device, at least one actionable portlet that enables said user to perform additional operations on said information residing in said associated standalone applications based on service oriented architecture.

2. The dynamic portal generation system of claim 1, wherein said portal generation module renders said portal based on a predefined template that corresponds to said name-entity or said name-entity type deduced from the given search query.

3. The dynamic portal generation system of claim 1, wherein said search module comprises a result categorization module that determines whether a number of documents returned in response to said search query is zero, within an optimal range, or in excess of said optimal range.

4. The dynamic portal generation system of claim 3, wherein said search module further comprises a related result reference module that refers to other sources to find related results when said number of documents returned in response to said search query is zero.

5. The dynamic portal generation system of claim 3, wherein said search module further comprises:
   a text clustering module that extracts text clusters from top ranked documents in said search result when said number of documents returned in response to said search query is in excess of said optimal range; and
   a search term suggestion module that suggests at least one alternate search term based on said text clusters and updates said index with an alternate search term that is selected by said user.

6. The dynamic portal generation system of claim 3, wherein said search module displays search results that obtain top ranked results when said number of documents returned in response to said search query is within an optimal range.

7. The dynamic portal generation system of claim 1, wherein said action module displays a link that displays additional information relevant to said matching name-entity from said information residing in associated standalone applications when said link is clicked by said user.

8. The dynamic portal generation system of claim 7, wherein said action module processes an input from said user in relation to at least one parameter and displays additional information residing in said associated standalone applications corresponding to said parameter in response to said input based on service oriented architecture.

9. The dynamic portal generation system of claim 1, wherein said format is at least one of a table, a graph, a chart, a dialog box, a list, a paragraph, and a drop down menu.

10. The dynamic portal generation system of claim 9, wherein said database further comprises a thesaurus that includes a hierarchical structure of said plurality of name entities, and said portal generation module displays a corresponding hierarchical structure of said matching name-entity retrieved from said thesaurus based on said search query.

11. The dynamic portal generation system of claim 1, wherein said information residing in said associated standalone applications further comprises a plurality of records and a plurality of user permissions.

12. A method for automatically generating a dynamic portal triggered by a search query in dynamic portal generation system, said dynamic portal generation system comprising an indexing module that indexes structured and unstructured data in a database to obtain an indexed information, wherein said database comprises an information residing in associated standalone applications comprising a plurality of documents from a plurality of information sources, and a name-entity repository, wherein said name-entity repository includes a plurality of a name entities and their corresponding name-entity types, said method comprising:
- searching said indexed information residing in said associated standalone applications to obtain a search result based on a search query from a user;
- extracting matching name entities from said search result that corresponds to a name-entity in said name-entity repository;
- aggregating said search result by a type or a source to form a plurality of search result segments;
- rendering a data extracted from at least one of said search result segments in a corresponding format as a portlet;
- integrating relevant actions corresponding to at least one of said search result segments; and
- displaying at least one actionable portlet that enables said user to perform additional operations on said information residing in said associated standalone applications.

13. The method of claim 12 further comprising determining whether a number of documents returned in response to said search query is zero, within an optimal range, or in excess of said optimal range.

14. The method of claim 13, further comprising referring to other sources to find related results when said number of documents returned in response to said search query is zero.

15. The method of claim 14, further comprising:
- extracting text clusters from top ranked documents in said search result when said number of documents returned in response to said search query is in excess of said optimal range;
- suggesting at least one an alternate search term based on said text clusters; and
- updating said index with an alternate search term that is selected by said user.

16. The method of claim 12, wherein said database further comprises a thesaurus that includes a hierarchical structure of said plurality of name entities, said method further comprising displaying a corresponding hierarchical structure of said matching name-entity retrieved from said thesaurus based on said search query.

17. The method of claim 16, wherein said dynamic portal is rendered based on a predefined template that corresponds to either a name-entity or a name-entity type of said matching name-entity based on the user given query.

18. A non-transitory program storage device comprising an indexing module that indexes structured and unstructured data in a database, wherein said database comprises:
- an information residing in associated standalone applications comprising a plurality of documents from a plurality of information sources, a plurality of records, a plurality of user permissions;
- a name-entity repository, wherein said name-entity repository includes a plurality of name entities and their corresponding name-entity types;
- a thesaurus that includes a hierarchical structure of said plurality of name entities; and a set of instructions that when executed by a processor, perform a method for automatically generating a dynamic portal triggered by a search query in dynamic portal generation system, said method comprising:
    - searching said information residing in said associated standalone applications to obtain a search result based on a search query from a user;
    - extracting a matching name-entity from said search result that corresponds to a name-entity in said name-entity repository;
    - aggregating said search result by a type or a source to form a plurality of search result segments;
    - rendering said dynamic portal based on a predefined template that corresponds to said name-entity or a type of said name-entity;
    - displaying a corresponding hierarchical structure of said matching name-entity retrieved from said thesaurus based on said search query;
    - rendering a data extracted from at least one of said search result segments in a corresponding format as a portlet;
    - integrating relevant actions corresponding to at least one of said search result segments;
    - displaying at least one actionable portlet that enables said user to perform additional operations on said information residing in said associated standalone applications; and
    - processing an input from said user in relation to at least one parameter and displaying additional information from said information residing in said associated standalone applications corresponding to said parameter in response to said input from said user.

19. The non-transitory program storage device of claim 18, wherein said method further comprises displaying a link that displays additional information relevant to said matching name-entity from said information residing in said associated standalone applications when said link is clicked by said user.

20. The non-transitory program storage device of claim 18, wherein said format is at least one of a table, a graph, a chart, a dialog box, a list, and a drop down menu.

* * * * *